United States Patent
Eichhorn et al.

(10) Patent No.: US 10,422,291 B2
(45) Date of Patent: Sep. 24, 2019

(54) METHOD AND DEVICE FOR CONTROLLING AN INTERNAL COMBUSTION ENGINE

(71) Applicant: Robert Bosch GmbH, Stuttgart (DE)

(72) Inventors: Alexander Eichhorn, Freiberg A.N. (DE); David Lejsek, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 15/529,585

(22) PCT Filed: Sep. 29, 2015

(86) PCT No.: PCT/EP2015/072309
§ 371 (c)(1),
(2) Date: May 25, 2017

(87) PCT Pub. No.: WO2016/082988
PCT Pub. Date: Jun. 2, 2016

(65) Prior Publication Data
US 2017/0284324 A1    Oct. 5, 2017

(30) Foreign Application Priority Data
Nov. 28, 2014 (DE) .................. 10 2014 224 333

(51) Int. Cl.
*F02D 41/40* (2006.01)
*F02D 41/02* (2006.01)
(Continued)

(52) U.S. Cl.
CPC ....... *F02D 41/0255* (2013.01); *F01N 3/2006* (2013.01); *F02D 19/0644* (2013.01);
(Continued)

(58) Field of Classification Search
CPC ........... F01N 2430/085; F02D 19/0644; F02D 19/0647; F02D 41/0027; F02D 41/402;
(Continued)

(56) References Cited

U.S. PATENT DOCUMENTS

2006/0242950 A1    11/2006   Wang et al.
2009/0193795 A1*    8/2009   Cleary ................ F02D 41/0275
                                                          60/295
2015/0075487 A1*    3/2015   Glugla .................. F02D 41/405
                                                          123/299

FOREIGN PATENT DOCUMENTS

| EP | 1281852 A2 | 2/2003 |
| EP | 2175122 A2 | 4/2010 |
| EP | 2594769 A2 | 5/2013 |

OTHER PUBLICATIONS

International Search Report dated Jan. 29, 2016, of the corresponding International Application PCT/EP2015/072309 filed Sep. 29, 2015.

* cited by examiner

*Primary Examiner* — Jonathan R Matthias
(74) *Attorney, Agent, or Firm* — Norton Rose Fulbright US LLP; Gerard Messina

(57) ABSTRACT

A method for injecting gaseous fuel directly into a combustion chamber of an internal combustion engine in order to heat a catalytic converter, the method including: carrying out a main injection of gaseous fuel directly into the combustion chamber; carrying out a first post-injection following the main injection but prior to an ignition, and following the ignition and preferably following the end of combustion in the combustion chamber, carrying out a second post-injection of gaseous fuel into the combustion chamber.

12 Claims, 1 Drawing Sheet

(51) Int. Cl.
*F02D 19/06* (2006.01)
*F01N 3/20* (2006.01)
*F02D 41/38* (2006.01)

(52) U.S. Cl.
CPC ....... *F02D 19/0647* (2013.01); *F02D 41/405*
(2013.01); *F02D 2041/389* (2013.01); *Y02T 10/36* (2013.01); *Y02T 10/44* (2013.01)

(58) Field of Classification Search
CPC . F02D 41/403; F02D 41/405; F02M 21/0203; F02M 21/0206; F02M 21/0209
See application file for complete search history.

METHOD AND DEVICE FOR CONTROLLING AN INTERNAL COMBUSTION ENGINE

FIELD

The present invention relates to a method for injecting gaseous fuel directly into a combustion chamber of an internal combustion engine in order to heat a downstream catalytic converter; the present invention also relates to a control unit for executing the method.

BACKGROUND INFORMATION

In addition to liquid fuels, gaseous fuels are also increasingly used as fuels in internal combustion engines in the more recent past. In comparison with gasoline-operated internal combustion engines, gas-operated internal combustion engines, using natural gas or autogas, for example, are an attractive alternative for realizing savings potentials and reducing a $CO_2$ emission. In addition, potentials with regard to reduced emissions are also obtainable. In an effort to achieve better efficiency, more attempts are also made to realize a direct injection of gas, where the gaseous fuel is injected directly into a combustion chamber of an internal combustion engine. An issue with gaseous fuels, especially natural gas, in comparison with gasoline or other liquid fuels is an exhaust-gas treatment. In particular if the gaseous fuel has methane ($CH_4$) as the main component, an exhaust-gas treatment becomes more complex than in the case or longer-chained hydrocarbons of liquid fuels. This is due especially to a lower conversion rate of current catalytic converters in conjunction with required higher process temperatures. A sufficient exhaust-gas treatment cannot be ensured in the case of cold catalytic converters, in particular. Raising a temperature of the catalytic converter to the required process temperature as quickly as possible would therefore be important.

SUMMARY

An example method according to the present invention for the injection of gaseous fuel directly into a combustion chamber of an internal combustion engine in order to heat a catalytic converter may have the advantage of allowing rapid and effective heating of a catalytic converter having a temperature below a predefined threshold temperature. As a result, exhaust-gas emissions during a cold start are able to be significantly reduced. In addition, the method according to the present invention allows for considerably smoother running of the internal combustion engine, which provides clear advantages for a user, especially in the idling operation. According to the present invention, this may be achieved, for example, in that the method, in a first step, executes a main injection of gaseous fuel directly into the combustion chamber of the internal combustion engine. This is followed by a first post-injection after the main injection, in which a fuel quantity of the first post-injection is preferably considerably smaller than the fuel quantity injected during the main injection. The first post-injection takes place prior to an ignition in the combustion chamber. According to the present invention, a second post-injection of gaseous fuel into the combustion chamber is carried out following the ignition and following the end of the combustion in the combustion chamber. The fuel quantity of the second post-injection is likewise considerably smaller than that of the main injection. With the aid of the second post-injection, another combustion following the actual main combustion is able to be realized, thereby significantly increasing an exhaust-gas temperature. The catalytic converter, which is connected downstream from the combustion chamber, can therefore heat up more quickly, so that the emissions of the internal combustion engine in a cold start are able to be significantly reduced also in a direct injection. Because in the case of compressed natural gas (CNG), for example, an efficient exhaust-gas purification requires a catalytic-converter temperature of approximately 420° C., which is approximately 120 Kelvin higher than in the case of gasoline, the exhaust-gas temperature should be as high as possible. Of course, attention should be paid to keep the raw emissions of uncombusted hydrocarbons and particles as low as possible because they would otherwise clearly worsen the emission behavior in a catalytic converter that is still not functioning due to insufficient temperatures. The first post-injection generates additional turbulence around the spark plug and thereby enriches the fuel-air mixture with fuel in this region shortly before the ignition. This facilitates a flame development, and the flame core formation, and thus a subsequent combustion, are stabilized.

Preferred further developments of the present invention are described herein.

The second post-injection is preferably carried out when a discharge valve on the combustion chamber is opened. An onset of the second post-injection and an onset of the opening of the discharge valve especially preferably take place at the same time. This allows for the generation of an intensive charge movement in the combustion chamber in the direction of the discharge valve. In conjunction with the high charge temperature in the combustion chamber, this facilitates the oxidation of the quantity of gaseous fuel introduced with the aid of the second post-injection. The additional conversion generates a higher temperature of the exhaust-mass flow, and thus its enthalpy, which is utilized for more rapid heating of the catalytic converter after a start of the internal combustion engine. The second post-injection and the opening of the discharge valve preferably take place simultaneously.

It is especially preferred if the second post-injection starts directly after the combustion in the combustion chamber has been concluded. At this moment, the temperatures in the combustion chamber are at their peak so that an immediate ignition of the fuel introduced by the second post-injection is possible. Here, it is also avoided that the second post-injection takes place directly into a flame in the combustion chamber, which would drastically increase the number of particles and the emissions.

It is furthermore preferred if the first post-injection and the second post-injection are of equal length. In addition, equal volumes of fuel and, in particular, equal quantities of gaseous fuel are preferably injected during the first post-injection and the second post-injection. This allows for a particularly uncomplicated control of the method.

According to another preferred further development of the present invention, the combustion process is carried out as a lean process. In particular, the combustion process is carried out using a lambda value of lambda of approximately 1.05. This makes it possible to minimize the raw $NO_x$ emissions, in particular.

In addition, if a pressure in the combustion chamber at the instant of the first post-injection is greater than a gas pressure of the gaseous fuel, the first post-injection and only the execution of the second post-injection may preferably be omitted.

The method according to the present invention is carried out using natural gas, in particular. Especially preferred for this purpose is the use of a gas injector that is optimized for a gas operation.

In addition, the present invention relates to a control unit that is designed for carrying out an example method for the injection of gaseous fuel directly into a combustion chamber of an internal combustion engine in order to heat a catalytic converter if the catalytic converter has a temperature below a threshold temperature. The method includes the steps of executing a main injection of gaseous fuel directly into the combustion chamber, and of executing a post-injection of gaseous fuel directly into the combustion chamber after a combustion in the combustion chamber has been concluded, so as to increase an exhaust-gas enthalpy. It is especially preferred if the control unit includes a memory in which a temperature model for the catalytic converter is stored. Based on the temperature model, the control unit is then set up for executing the injection strategy and the method according to the present invention for heating the catalytic converter. As an alternative, it is also possible to provide a temperature sensor on the catalytic converter, which reports the instantaneous temperature to the control unit, the control unit then carrying out the preheating method on the basis of the received temperature value.

According to the present invention, a post-injection is thus carried out, preferably following the end of combustion, in order to increase an exhaust-gas enthalpy. An ignition of the post-injected gaseous fuel takes place in the combustion chamber due to the still prevailing high temperatures. The present invention may therefore also be used if a gas pressure is reduced, for instance on account of a relatively low gas tank level, because the pressure is low when the discharge valve opens following the combustion, so that a post-injection is nevertheless possible.

BRIEF DESCRIPTION OF THE DRAWINGS

Below, a preferred exemplary embodiment of the present invention is described in detail with reference to the figures.

DETAILED DESCRIPTION OF EXAMPLE EMBODIMENTS

Below, an example method according to the present invention for the injection of gaseous fuel directly into a combustion chamber 2 of an internal combustion engine 1 in order to heat a catalytic converter 7 is described in detail with reference to FIGS. 1 and 2.

The heating of catalytic converter 7 is necessary when it has a temperature below a predefined threshold temperature. In comparison with liquid fuels, a required working temperature of the catalytic converter is approximately 100 K higher for gaseous fuels and lies at approximately 420° C.

Figure 1:
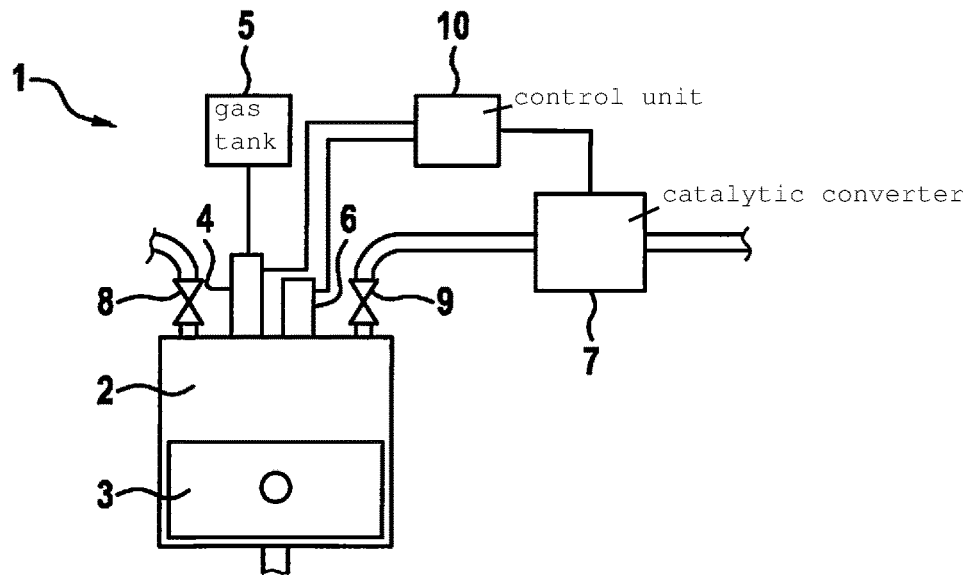
FIG. 1 shows a schematic illustration of a directly-injecting internal combustion engine.

As can be gathered from FIG. 1, internal combustion engine 1 includes a piston 3 disposed in combustion chamber 2, an injector 4, and an ignition device 6 such as a spark plug.

Injector 4 is situated directly on combustion chamber 2 in order to inject gaseous fuel directly into the combustion chamber. Injector 4 is connected to a gas tank 5.

Catalytic converter 7 is provided in the exhaust tract. In the conventional manner, combustion chamber 2 has been provided with at least one inlet valve 8 and at least one discharge valve 9.

Reference numeral 10 denotes a control unit which is designed to control the internal combustion engine during a heating operation of the catalytic converter. In the following text, the method according to the present invention will be described with reference to FIG. 2.

To begin with, the example method according to the present invention includes the step of carrying out a main injection of the gaseous fuel directly into the combustion chamber of the internal combustion engine. The injected fuel quantity is determined by the driver, for instance via the operation of the accelerator. According to the present invention, once the process of main injection H has taken place, a first post-injection N1 is carried out, which takes place even before an ignition Z of the fuel-air mixture in combustion chamber 2. First post-injection N1 has the advantage of generating additional turbulence around the spark plug and of enriching this region with fuel shortly before the ignition. First post-injection N1 takes place approximately at a crank angle of 5° in advance of actual ignition Z. This facilitates an ignition in the combustion chamber, and the flame core development, and thus the subsequent combustion, are able to be stabilized.

According to the present invention, a second post-injection N2 of gaseous fuel into the combustion chamber takes place after the combustion has been completely finalized. With the aid of the second post-injection another combustion following the actual main combustion is carried out. This significantly increases an exhaust-gas temperature so that the post-connected catalytic converter 7 is able to heat up more rapidly. As can be gathered from the diagram of FIG. 2, an opening of the discharge valve and the second post-injection N2 take place simultaneously, at a crank angle W of approximately 110°.

Preferably, second post-injection N2 takes place immediately following combustion V. In addition, the first and the second post-injection are of equal length, which can be gathered from the width of the bars in FIG. 2 above crank angle W.

In addition, the method according to the present invention also offers another advantage. In the event that the first post-injection is unable to be injected, for instance when the pressure in the combustion chamber prior to the ignition instant is too high and the injection pressure is too low, which may be due to an empty gas tank, the second post-injection N2 may possibly be carried out nevertheless. As can be gathered from the diagram of FIG. 2, second post-injection N2 is carried out at a pressure of under $5\times10^5$ Pa. As a result, despite the omittance of first post-injection N1, an exhaust-gas enthalpy is able to be increased during second post-injection N2 without causing any negative effect on the smooth running of the engine. Minimum particle emissions during the heating of the catalytic converter are also achieved in the process.

Figure 2:
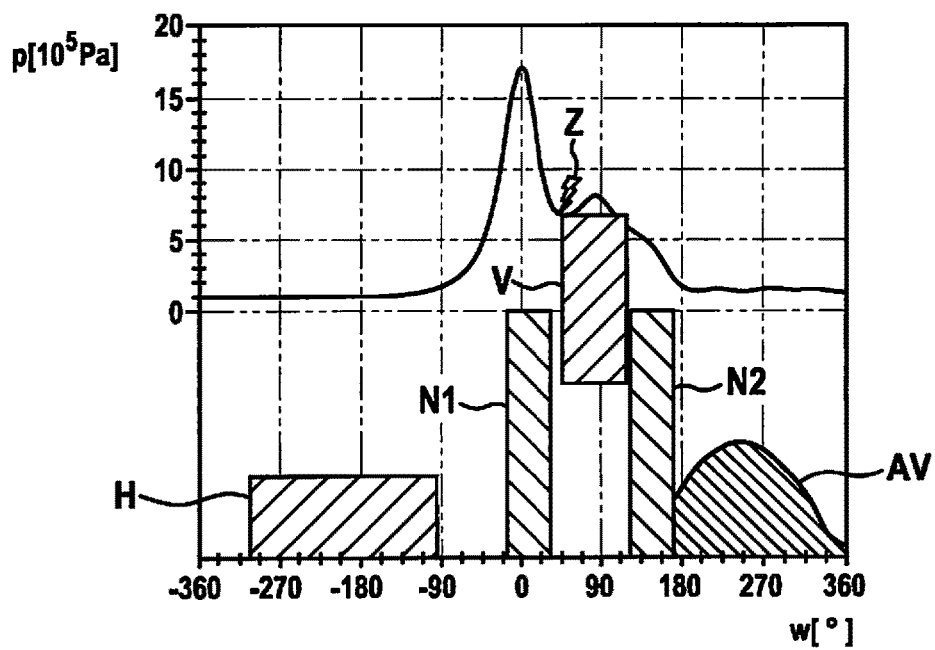
FIG. 2 shows a schematic diagram that illustrates the method according to the present invention.

The diagram shown in FIG. 2 illustrates a pressure p over crank angle W. The positions of main injection H, first post-injection N1, combustion V, and second post-injection N2 have been plotted in the lower part of the diagram of FIG. 2. Also shown is an ignition instant Z. Moreover, in the lower part, an opening of discharge valve AV is also illustrated over the crank angle, the discharge valve opening shortly after 90° crank angle.

In addition, the present invention relates to a method for injecting gaseous fuel directly into a combustion chamber of an internal combustion engine for the purpose of heating a catalytic converter, a gas pressure of the gaseous fuel shortly in advance of a top dead center being lower at a compression in the Otto combustion cycle than a pressure in the combustion chamber, the method including the following steps: Carrying out a main injection of gaseous fuel directly into the combustion chamber, and after the compression, ignition and combustion, carrying out a post-injection into the combustion chamber in order to increase an exhaust-gas enthalpy.

What is claimed is:

1. A method for injecting gaseous fuel directly into a combustion chamber of an internal combustion engine in order to heat a catalytic converter, the method comprising:

carrying out a main injection of gaseous fuel directly into the combustion chamber;

carrying out a first post injection following the main injection but prior to an ignition; and following the ignition and following the end of combustion in the combustion chamber, carrying out a second post-injection of gaseous fuel into the combustion chamber, wherein between a beginning of the main injection and an end of the first post injection of the same combustion cycle in which the main injection precedes the first post injection, the combustion chamber is free of any ignition.

2. The method as recited in claim 1, wherein the second post-injection is carried out when a discharge valve on the combustion chamber is open.

3. The method as recited in claim 1, wherein the second post-injection and the opening of the discharge valve begin simultaneously.

4. The method as recited in claim 1, wherein the second post-injection begins directly after the end of the combustion in the combustion chamber.

5. The method as recited in claim 1, wherein the first and the second post-injection are of equal length.

6. The method as recited in claim 1, wherein gas volumes of gaseous fuel of equal size are injected into the combustion chamber during the first and the second post-injections.

7. The method as recited in claim 1, wherein the combustion process is carried out as a lean process, at a lambda value of 1.05.

8. The method as recited in claim 1, wherein the gaseous fuel is natural gas.

9. The method as recited in claim 1, wherein an amount of fuel in the first post injection is smaller than an amount of fuel in the main injection.

10. A method for injecting gaseous fuel directly into a combustion chamber of an internal combustion engine in order to heat a catalytic converter, the method comprising:

carrying out a main injection of gaseous fuel directly into the combustion chamber;

carrying out a first post injection following the main injection but prior to an ignition; and following the ignition and following the end of combustion in the combustion chamber, carrying out a second post-injection of gaseous fuel into the combustion chamber, wherein if a pressure in the combustion chamber at the instant of the first post-injection is greater than a gas pressure of the gaseous fuel, the first post-injection is omitted and only the second post-injection is carried out.

11. A control unit for injecting gaseous fuel directly into a combustion chamber of an internal combustion engine in order to heat a catalytic converter, the control unit designed to:

carry out a main injection of gaseous fuel directly into the combustion chamber;

carry out a first post injection following the main injection but prior to an ignition; and following the ignition and following the end of combustion in the combustion chamber, carry out a second post-injection of gaseous fuel into the combustion chamber, wherein between a beginning of the main injection and an end of the first post injection of the same combustion cycle in which the main injection precedes the first post injection, the combustion chamber is free of any ignition.

12. The control unit as recited in claim 11, wherein an amount of fuel in the first post injection is smaller than an amount of fuel in the main injection.

* * * * *